2,935,381
MANUFACTURE OF HYDROGEN PEROXIDE

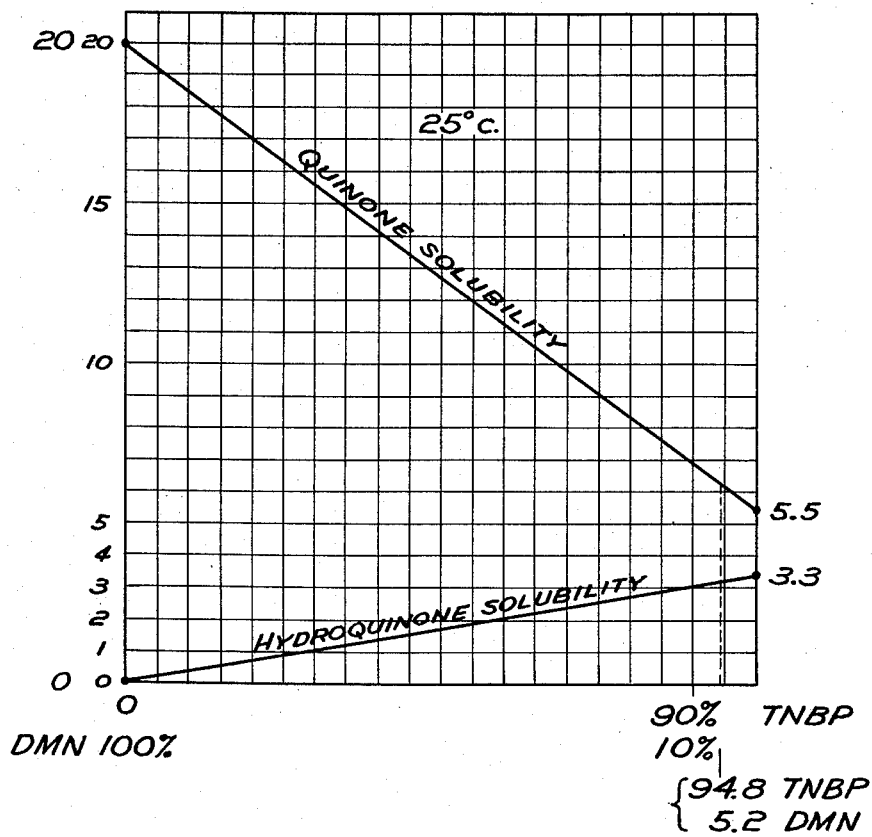

Leonard R. Darbee, Grand Island, and Paul G. Conroy, Buffalo, N.Y., assignors to Food Machinery and Chemical Corporation, San Jose, Calif.

Application April 19, 1957, Serial No. 653,972

3 Claims. (Cl. 23—207)

This invention relates to the production of hydrogen peroxide by an improvement in the so-called anthraquinone process of manufacturing that product.

The ability of certain groups to undergo alternate hydrogenation and oxidation with the production of hydrogen peroxide has been known for many years. Commercial adaptation of these characteristic reactions is outlined in Patents 2,158,525 and 2,215,883 of Pfleiderer and Riedl wherein it was proposed that the cyclic operation be performed in a mixed solvent containing a solvent constituent for dissolving the quinone form of the working material, an alkylated anthraquinone or the tetrahydro derivatives thereof, and a solvent constituent for dissolving the hydroquinone form of the working material. A detailed analysis of the commercial operation of the anthraquinone process employing a mixed solvent is outlined in a publication of the Publication Board, Department of Commerce, Washington, D.C., PB Report 4336.

Subsequent investigators attempted to improve upon the process by searching for solvents having greater dissolving power for the working material in the quinone form or hydroquinone form or both, and these developments are detailed in Patent 2,455,238 of Dawsey et al. showing the employment of esters af sebasic acid, and in Patents 2,537,655 and 2,537,516 of Dawsey et al. showing the employment of organic phosphate esters and organic phosphonate esters respectively as improved constituents in a mixed solvent particularly adapted to dissolve the hydroquinone form of the working material.

Improved solubility of the working material was also made possible by the employment of a mixed solvent containing certain aromatic solvents as a constituent for dissolving the quinone form of the working material, all as outlined in certain patents of Dawsey et al., No. 2,768,065 and No. 2,768,066.

It will be noted from the above that substantially the entire research effort employed in improving the anthraquinone process of manufacturing hydrogen peroxide has been directed to the end that one would have available better solvents for each form of the working material and employing such solvents as constituents in the usual mixed solvent.

The approach to improving the anthraquinone process in all cases has been an effort to carry a greater amount of working material in a given amount of working solution thereby proportionately to increase the yield of hydrogen peroxide from a unit volume or amount of working solution.

In U.S. Patent No. 2,689,169 to Hinegardner, suggestions were made allegedly for improving the amount of working material by selecting as a working component an alkylated anthraquinone presumably producing a greater concentration in known solvents.

In Serial No. 618,069, filed October 24, 1956, by Leonard R. Darbee and Donald F. Kreuz, an approach was made for choosing special mixtures of alkylated anthraquinones and their tetrahydro derivatives which possessed markedly greater solubility in known solvents, such mixtures being compositions which are the eutectic mixtures or mixtures in the immediate neighborhood of such compositions.

The instant invention also deals with means for improving the solubility of the working compound by employment of particular alkylated anthraquinones and their tetrahydro derivatives in specified amounts of solvent, all to the end that the concentration in unit volume of working solution may be enhanced.

The particular advantages of the present invention are obtained by employing as the working compound either preferably 2-secondary butylanthraquinone or 2-isopropyl-anthraquinone, as these two alkylated anthraquinones possess a particular characteristic as to solvency which appears not to be possessed by the other usually employed alkylated anthraquinones, namely, the methyl, ethyl or tertiary butyl compounds.

The hydroquinone forms of methyl, ethyl and tertiary butyl anthraquinones exhibit substantially no solvency in those solvents which have heretofore been designated quinone solvents. The quinone form of methyl, ethyl and tertiary butyl anthraquinone exhibit much less solvency than their hydroquinone forms in solvents heretofore designated as hydroquinone solvents. It has now been found that this relationship in hydroquinone solvents is reversed in the case of the 2-secondary-butyl and 2-isopropyl substituted compound. This relationship is strikingly shown in Table 1 below, where the figures given represent the number of grams of the indicated alkylated material soluble in 10 cc. of the specified solvent at 25° C., where "Q Form" represents the quinone form and "HQ" the hydroquinone form of the specified alkylated anthraquinone.

Table 1

| Alkylated Anthraquinone | Trioctyl Phosphate | | Tri-n-butyl Phosphate | | Tri (2-ethyl-butyl) Phosphate | |
|---|---|---|---|---|---|---|
| | Q Form | HQ Form | Q Form | HQ Form | Q Form | HQ Form |
| 2-methyl | 0.1 | 1.75 | 0.1 | 2.80 | 0.1 | 1.60 |
| 2-ethyl | 0.40 | 2.06 | 0.57 | 3.36 | 0.45 | 1.85 |
| 2-tertiarybutyl | 0.93 | 2.80 | 1.2 | 4.33 | 0.91 | 2.44 |
| 2-secondarybutyl | 3.16 | 1.89 | 5.5 | 3.3 | 3.77 | 1.73 |
| 2-isopropyl | 2.6 | 1.48 | 4.35 | 2.43 | 2.86 | 1.58 |

Reference to Table 1 above will show that when considered 2-tertiary butylanthraquinone its solubility in the three specified organic phosphate esters normally considered as solvents for the hydroquinone form of the working material possesses the normal characteristic expected, namely, a substantially greater solubility of the hydroquinone form than of the quinone form. In this respect the tertiary butylanthraquinone behaves in the same fashion as the methyl derivative and the ethyl derivative. Thus the solubility of 2-tertiary butylanthraquinone in tri-n-butyl phosphate is 1.2 g. in 10 cc. at 25° C., whereas that of tertiary butylanthrahydroquinone is 4.33 g. in 10 cc. of that solvent at the same temperature, a solubility advantage of more than 3½ times with respect to the hydroquinone form.

When considering the solubility of secondary butyl anthraquinone however, in the same solvent, the quinone form of that material is 5.5 g. in 10 cc. of tri-n-butyl phosphate and the solubility of the hydroquinone form is less, being only 3.3 g. in 10 cc. of that solvent at 25° C. This same relationship of solubility exists in the other solvents listed, which solvents are thought of in the art as being solvents for the hydroquinone form of the working material. The same reversed relationship exists when considering isopropyl anthraquinone.

In accordance with the present invention considerable advantage in concentration of working material is obtained when a working solution for use in the cyclic hydrogenation and oxidation to produce hydrogen peroxide is made up from either secondary butylanthraquinone, isopropylanthraquinone or mixtures thereof and particularly the eutectic mixture and to employ as the working solvent either a mixed solvent or a single solvent, the essential major constituent of which is a solvent heretofore designated as a solvent for the hydroquinone form of the usual alkylated anthraquinones heretofore employed in the anthraquinone process for the manufacture of hydrogen peroxide. Solvents of particular applicability are the organic esters of phosphoric acid.

This same apparent reversal of solubility has been found to be present in the case of the generally employed C-7 to C-11 aliphatic alcohols, as for instance the generally employed nonyl alcohols, alkyl cyclohexanols and phosphonate esters, all generally considered heretofore as solvents for the hydroquinone form of the working material.

A simplified concept of the advantages of the invention may be obtained by considering the solubility of the quinone form and hydroquinone form of secondary butyl anthraquinone in tri-n-butylphosphate. Under an operating temperature of 25° C., 100 cc. of tri-n-butyl phosphate would carry in solution 55 g. of the quinone form of working material and therefore no additional solvent need be employed to carry the product produced in the hydrogenation step of the anthraquinone process provided the hydrogenation be not carried further than 60% ($30/55 \times 100$).

Table 2 below sets forth the solubility in grams of the indicated alkylated anthraquinone in dimethylnaphthalene, a solvent representative of a class of solvents known as solvents for the quinone form of the working material and presently considered a solvent of particular advantage in the mixed solvent process.

Table 2

| Alkylated Anthraquinone | Dimethylnaphthalene | |
|---|---|---|
| | Quinone Form | Hydroquinone Form |
| 2-methyl | .78 | 0.0 |
| 2-ethyl | 3.20 | 0.0 |
| 2-tertiary butyl | 5.9 | 0.0 |
| 2-secondary butyl | 20.0 | 0.0 |
| 2-isopropyl | 27.0 | 0.0 |

In the drawing the single figure shows the solubility of 2-secondary butylanthraquinone in tri-n-butyl phosphate and dimethylnaphthalene mixtures. It will be noted that the hydroquinone form is insoluble in dimethylnaphthalene, that is 0.0 gram, and is soluble to the extent of 3.3 grams in 10 cc. of tri-n-butyl phosphate, while the quinone form of the secondary butyl derivative is soluble to the extent of 20 g. in 10 cc. of dimethylnaphthalene at 25° C. and to the extent of 5.5 g. in 10 cc. of tri-n-butyl phosphate.

A working solution containing 94.8% by volume of tri-n-butyl phosphate and 5.2% by volume of dimethylnaphthalene will carry as working material 6.24 g. 2-secondary butyl anthraquinone in 10 cc. Hydrogenating to 50% produces no cloud so that all the hydroquinone forms thereby produced remained soluble.

On subsequent oxidation and water extraction of the working solution, a yield of hydrogen peroxide of 0.267 g. is obtained, a yield equivalent to 26.7 g. per liter of working solution. This is in contrast to a yield of 5.5 g. hydrogen peroxide per liter in the commercial operation described in PB Report 4336, of 11 g. per liter as shown in U.S. Patent No. 2,689,169, and 11.3 g. per liter as shown in U.S. Patent No. 2,768,066.

A singular advantage of the present invention, as will be seen from above, resides in the very material reduction in amount of solvent and accompanying increase in amount of working material capable of being carried and operated upon for the production of hydrogen peroxide through the hydrogenation cycle while maintaining each of the quinone form and hydroquinone form in solution thereby increasing the production capacity of a given installation which consists of, in broad aspect at least, a hydrogenating chamber or column, an oxidizing chamber or column and an extracting chamber or column or peroxide extractor where the hydrogen peroxide is extracted with water.

In the experimental data above, results have been shown in systems employing tri-n-butyl phosphate as the hydroquinone solvent and dimethylnaphthalene as the quinone solvent. It will be understood that comparable results can be obtained by using mixtures of solvents known as hydroquinone solvents or mixtures of solvents known as quinone solvents instead of the single species of each class as illustrated above.

Additional data is shown below for various systems wherein the yield of hydrogen peroxide is indicated at various depths of hydrogenation. There is also given the volume fraction of the working solution of specified solvent for the hydroquinone form. In the instances shown below, the solvent is constituted of di-isobutyl carbinol and alphamethylnaphthalene. The solubility of secondary butyl anthraquinone in 10 cc. of the specified solvent is given in the table below.

Table 3

| Compound | Solvent | Solubility |
|---|---|---|
| Secondary butylanthraquinone. | alpha-methyl naphthalene | 22.7 g. in 10 cc. |
| Do | di-isobutyl carbinol | 1.95 g. in 10 cc. |
| Secondary butylanthra-hydroquinone. | alpha-methyl naphthalene | 0.0 g. in 10 cc. |
| Do | di-isobutyl carbinol | 1.43 g. in 10 cc. |

When secondary butylanthraquinone is employed in a mixed solvent of alphamethylnaphthalene and di-isobutyl carbinol and the solution designated worked at maximum capacity at 30° C., for the selected degree of hydrogenation, the following yields of hydrogen peroxide are obtained:

Table 4

| Depth of Hydrogenation in Percent of Complete Hydrogenation | Volume Fraction Di-isobutyl Carbinol | Yield Hydrogen Peroxide, Grams $H_2O_2$ per liter |
|---|---|---|
| 20 | 0.813 | 10.2 |
| 30 | 0.889 | 12.2 |
| 40 | 0.983 | 13.5 |
| 50 | 0.962 | 14.5 |
| 60 | 0.981 | 15.2 |
| 70 | 0.996 | 15.8 |
| 80 | 1.00 | 16.1 |

In the same manner, isopropyl anthraquinone worked in a mixed solvent of dimethylnaphthalene and tri-normal butyl phosphate, if worked at maximum capacity of 25° C. for the selected depth of hydrogenation indicated also shows exceptional yield of hydrogen peroxide. The solubility data is as follows:

Table 5

| Compound | Solvent | Solubility |
|---|---|---|
| Isopropylanthraquinone | Dimethylnaphthalene | 27.0 g. in 10 cc. |
| Do | Tri-normal butyl phosphate. | 4.35 g. in 10 cc. |
| Isopropylanthrahydroquinone | Dimethylnaphthalene | 0.0 g. in 10 cc. |
| Do | Tri-normal butyl phosphate. | 2.30 g. in 10 cc. |

Table 6

| Depth of Hydrogenation in Percent of Complete Hydrogenation | Volume Fraction Tri-normal butyl Phosphate | Yield Hydrogen Peroxide, Grams $H_2O_2$ per liter |
|---|---|---|
| 20 | .776 | 14.4 |
| 30 | .879 | 18.4 |
| 40 | .940 | 21.2 |
| 50 | .982 | 23.3 |
| 60 | 1.00 | 24.9 |
| 70 | 1.00 | 25.8 |
| 80 | 1.00 | 26.5 |

In like manner, the system 2-secondary butyl anthraquinone as the working compound in a working solution of dimethyl naphthalene and tri(2-ethyl hexyl)-phosphate worked to maximum capacity at 25° C. at the various selected depths of hydrogenation give the following results:

Table 7

| Compound | Solvent | Solubility |
|---|---|---|
| Secondary butylanthraquinone. | Dimethylnaphthalene | 20.0 g. in 10 cc. |
| Do | Tri-octyl phosphate | 3.16 g. in 10 cc. |
| Secondary butylanthrahydroquinone. | Dimethylnaphthalene | 0.0 g. in 10 cc. |
| Do | Tri-octyl phosphate | 1.89 g. in 10 cc. |

Table 8

| Depth of Hydrogenation in Percent of Complete Hydrogenation | Volume Fraction Tri-octyl Phosphate | Yield Hydrogen Peroxide, Grams $H_2O_2$ per liter |
|---|---|---|
| 20 | .761 | 11.7 |
| 30 | .865 | 14.5 |
| 40 | .929 | 16.7 |
| 50 | .970 | 18.2 |
| 60 | 1.00 | 19.4 |
| 70 | 1.00 | 20.0 |
| 80 | 1.00 | 20.4 |

Pursuant to the requirements of the patent statutes, the principles of this invention have been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the process of producing hydrogen peroxide by the alternate reduction and oxidation of an alkylated anthraquinone as the working material dissolved in a mixed solvent containing a first constituent for solution of both the hydroquinone form and the quinone form of the working material, said first constituent being a solvent from the group consisting of the phosphate esters, the phosphonate esters, and the C-7 to C-11 aliphatic alcohols, and a second constituent in which the hydroquinone form is substantially insoluble for dissolving the quinone form of the working material, the improvement which comprises employing as the working material an alkylated anthraquinone selected from the group consisting of 2-secondary butyl anthraquinone and 2-isopropyl anthraquinone and a mixed solvent in which said first constituent is present to the extent of above 76 volume percent of the total amount of said first constituent plus said second constituent, whereby the volume of solvent is smaller than that heretofore employed.

2. Process in accordance with claim 1 in which the first constituent is an organic ester of phosphoric acid.

3. Process in accordance with claim 1 in which the first constituent is a C-7 to C-11 aliphatic alcohol, and is present to the extent of above 81 volume percent of the total amount of said first constituent plus said second constituent.

References Cited in the file of this patent
UNITED STATES PATENTS

| 2,668,753 | Harris et al. | Feb. 9, 1954 |
| 2,768,065 | Dawsey et al. | Oct. 23, 1956 |